United States Patent
Jin (10) Patent No.: US 11,353,187 B1
(45) Date of Patent: Jun. 7, 2022

(54) LAMP FOR VEHICLE

(71) Applicant: HYUNDAI MOBIS CO., LTD., Seoul (KR)

(72) Inventor: Min Ji Jin, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/135,829

(22) Filed: Dec. 28, 2020

(30) Foreign Application Priority Data

Nov. 30, 2020 (KR) .................. 10-2020-0164977

(51) Int. Cl.
| | |
|---|---|
| F21S 41/275 | (2018.01) |
| F21S 41/26 | (2018.01) |
| F21S 43/20 | (2018.01) |
| F21S 43/31 | (2018.01) |
| F21S 41/32 | (2018.01) |
| F21W 102/30 | (2018.01) |

(52) U.S. Cl.
CPC .......... *F21S 41/275* (2018.01); *F21S 41/26* (2018.01); *F21S 41/321* (2018.01); *F21S 43/20* (2018.01); *F21S 43/31* (2018.01); *F21W 2102/30* (2018.01)

(58) Field of Classification Search
CPC ........ F21S 41/26; F21S 41/275; F21S 41/321; F21S 43/20; F21S 43/31; F21W 2102/13; F21W 2102/30
See application file for complete search history.

(56) References Cited

U.S. PATENT DOCUMENTS

| | | | | |
|---|---|---|---|---|
| 7,918,594 | B2* | 4/2011 | Watanabe | B60Q 1/143 362/543 |
| 2004/0208020 | A1* | 10/2004 | Ishida | F21V 5/04 362/545 |
| 2009/0190323 | A1* | 7/2009 | Watanabe | B60Q 1/143 362/37 |
| 2011/0235349 | A1* | 9/2011 | Nakaya | F21S 41/151 362/466 |

(Continued)

FOREIGN PATENT DOCUMENTS

| | | | |
|---|---|---|---|
| DE | 10 2004 019318 | 11/2004 | |
| DE | 10 2011 006380 | 10/2012 | |
| EP | 2420728 | * 2/2012 | ............ F21S 41/689 |

OTHER PUBLICATIONS

German Office Action issued in DE 10 2020 135 001.5 dated Jul. 20, 2021.

(Continued)

*Primary Examiner* — Zheng Song
(74) *Attorney, Agent, or Firm* — DLA Piper LLP (US)

(57) ABSTRACT

A lamp for a vehicle includes a first lamp module including a first lens that forms a first light distribution pattern with light emitted from a first light source device, a second lamp module including a second lens that forms a second light distribution pattern with light emitted from a second light source device, and a third lamp module including a third lens that forms a third light distribution pattern with light emitted from a third light source device. The first lens and the second lens are formed such that a horizontal focus and a vertical focus are the same as each other, and the third lens is formed such that a horizontal focus and a vertical focus differ from each other.

9 Claims, 12 Drawing Sheets

(56) References Cited

U.S. PATENT DOCUMENTS

| | | | | |
|---|---|---|---|---|
| 2012/0106187 A1* | 5/2012 | Uchida | ............... | F21S 45/49 |
| | | | | 362/516 |
| 2013/0223089 A1* | 8/2013 | Danner | ............... | F21S 41/24 |
| | | | | 362/511 |
| 2014/0321135 A1* | 10/2014 | Chen | ............... | B60Q 1/12 |
| | | | | 362/487 |
| 2017/0292668 A1* | 10/2017 | Arai | ............... | F21S 45/47 |
| 2018/0187851 A1* | 7/2018 | Hossfeld | ............ | F21S 41/40 |
| 2018/0281671 A1* | 10/2018 | Na | ............... | F21S 41/255 |
| 2018/0356060 A1* | 12/2018 | Kasano | ............ | B60Q 1/0483 |
| 2019/0137052 A1* | 5/2019 | Hwang | ............ | F21K 9/60 |
| 2019/0203900 A1* | 7/2019 | Nishimura | ......... | B60Q 1/04 |
| 2019/0322209 A1* | 10/2019 | Sugiyama | ........... | F21S 41/43 |
| 2020/0072432 A1* | 3/2020 | Spencer | ............ | F21S 41/153 |
| 2020/0173621 A1* | 6/2020 | Brueggemann | ...... | F21V 5/04 |

OTHER PUBLICATIONS

English Language Abstract of DE 10 2004 019318 issued Nov. 25, 2004.
English Language Abstract of DE 10 2011 006380 issued Oct. 4, 2012.

* cited by examiner

LAMP FOR VEHICLE

CROSS-REFERENCE TO RELATED APPLICATION

This application claims the benefit of priority to Korean Patent Application No. 10-2020-0164977, filed in the Korean Intellectual Property Office on Nov. 30, 2020, the entire contents of which are incorporated herein by reference.

TECHNICAL FIELD

The present disclosure relates to a lamp for a vehicle, and more particularly, relates to a vehicle lamp having improved optical efficiency and differentiated design.

BACKGROUND

In general, a vehicle is equipped with various types of lamps having a lighting function of allowing a driver to easily identify objects around the vehicle during night driving and a signal function of informing other drivers and pedestrians of driving states of the vehicle.

For example, a vehicle is equipped with headlamps (or, headlights) and fog lamps for lighting functions and turn signal lamps, tail lamps, brake lamps, side markers, and the like for signal functions. The installation standards and specifications of the vehicle lamps are defined by law such that the vehicle lamps sufficiently perform functions thereof.

Among the vehicle lamps, the headlamps forming a low-beam pattern or a high-beam pattern such that a driver's view is ensured during night driving play an important role in stable driving. In recent years, design differentiation of headlamps has become more important.

However, in the related art, a light distribution pattern is formed by applying an aspheric lens having a single focus. Accordingly, it is difficult to variously implement arrangements and sizes of headlamps and light distribution patterns, and therefore there is a limitation in designs of headlamps.

Furthermore, in a case of reducing the size when the aspheric lens is applied, performance is limited due to low optical efficiency at a specific height or less. Accordingly, a headlamp technology for differentiating design and optimizing optical efficiency is required.

SUMMARY

The present disclosure has been made to solve the above-mentioned problems occurring in the prior art while advantages achieved by the prior art are maintained intact.

An aspect of the present disclosure provides a vehicle lamp for optimizing optical efficiency and ensuring competitiveness through design differentiation, by dividing the vehicle lamp into unit lamp modules depending on light distribution patterns and diversifying the sizes and numbers of the unit lamp modules.

Another aspect of the present disclosure provides a vehicle lamp for implementing various designs by minimizing the sizes of unit lamp modules and for improving lamp performance by ensuring a tolerance while forming a wide angle by including a third lens having a horizontal focus and a vertical focus different from each other.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp for a vehicle includes a first lamp module including a first lens that forms a first light distribution pattern with light emitted from a first light source device, a second lamp module including a second lens that forms a second light distribution pattern with light emitted from a second light source device, and a third lamp module including a third lens that forms a third light distribution pattern with light emitted from a third light source device. The first lens and the second lens are formed such that a horizontal focus and a vertical focus are the same as each other, and the third lens is formed such that a horizontal focus and a vertical focus differ from each other.

The first lamp module, the second lamp module, and the third lamp module may be arranged in a predetermined form, and the first lamp module, the second lamp module, and the third lamp module may include one or more first lamp modules, one or more second lamp modules, and one or more third lamp modules, respectively.

The first lens and the second lens may be formed such that a horizontal curvature and a vertical curvature of an incident surface on which light is incident are the same as each other.

Each of the first lens and the second lens may be implemented with an aspheric lens.

When a distance between a first focus formed by the first lens and the first lens is referred to as a first focal distance and a distance between a second focus formed by the second lens and the second lens is referred to as a second focal distance, the first focal distance may be longer than or equal to the second focal distance.

When a distance between a third horizontal focus formed by the third lens in a horizontal direction and the third lens is referred to as a third horizontal focal distance and a distance between a third vertical focus formed by the third lens in a vertical direction and the third lens is referred to as a third vertical focal distance, the third lens may be formed such that the third horizontal focal distance is shorter than the third vertical focal distance.

A horizontal curvature and a vertical curvature of an incident surface of the third lens on which light is incident may differ from each other such that the third horizontal focal distance is shorter than the third vertical focal distance.

The second lens and the third lens may be formed such that the third horizontal focal distance is shorter than or equal to the second focal distance.

The third light distribution pattern may have a larger area than the second light distribution pattern, and the second light distribution pattern may have a larger area than the first light distribution pattern.

The first lamp module may further include a first reflector that concentrates the light emitted from the first light source device on the first focus and a first shield that blocks part of light reflected by the first reflector. The second lamp module may further include a second reflector that concentrates the light emitted from the second light source device on the second focus and a second shield that blocks part of light reflected by the second reflector. The third lamp module may further include a third reflector that concentrates the light emitted from the third light source device on the third horizontal focus and the third vertical focus and a third shield that blocks part of light reflected by the third reflector. The first reflector, the second reflector, and the third reflector may have different sizes and shapes, the first shield, the second shield, and the third shield may have different sizes and shapes, and the first light distribution pattern, the second light distribution pattern, and the third light distribution pattern may have different light distribution characteristics.

The third shield may be disposed at the third vertical focus.

The first light source device may include a first substrate on which a first light source is disposed, the second light source device may include a second substrate on which a second light source is disposed, and the third light source device may include a third substrate on which a third light source is disposed. The first substrate, the second substrate, and the third substrate may be disposed on the same virtual plane.

BRIEF DESCRIPTION OF THE DRAWINGS

The above and other objects, features and advantages of the present disclosure will be more apparent from the following detailed description taken in conjunction with the accompanying drawings:

FIG. 2 is a schematic view illustrating the vehicle lamp according to the embodiment of the present disclosure, where FIG. 2 illustrates optical paths formed by a first lamp module, a second lamp module, and a third lamp module;

DETAILED DESCRIPTION

Hereinafter, embodiments of the present disclosure will be described in detail with reference to the accompanying drawings.

The embodiments to be described below are embodiments appropriate for understanding of technical features of a vehicle lamp according to the present disclosure. However, the present disclosure is not restrictively applied to the embodiments to be described below, and technical features of the present disclosure are not limited by the embodiments to be described. Furthermore, various changes and modifications can be made without departing from the spirit and scope of the present disclosure.

Figure 1:
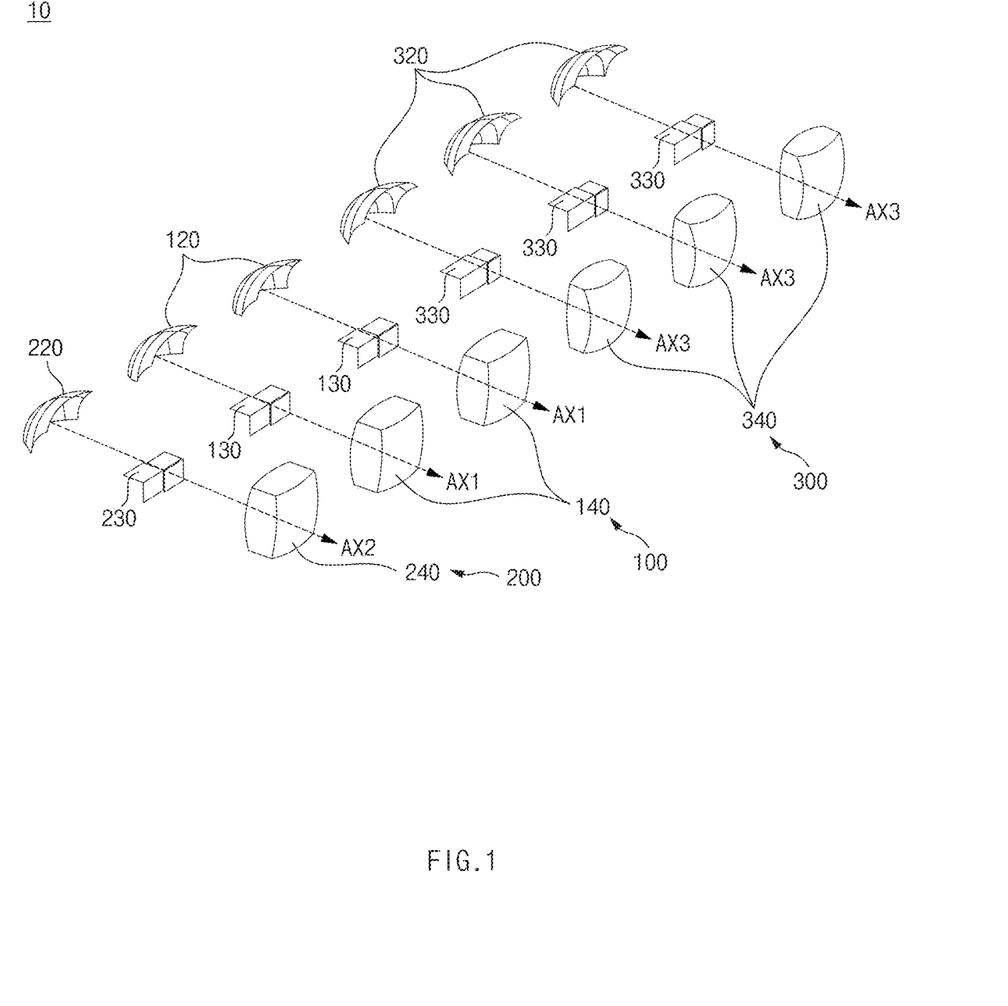
FIG. 1 is a schematic perspective view illustrating a vehicle lamp according to an embodiment of the present disclosure.
Figure 2:
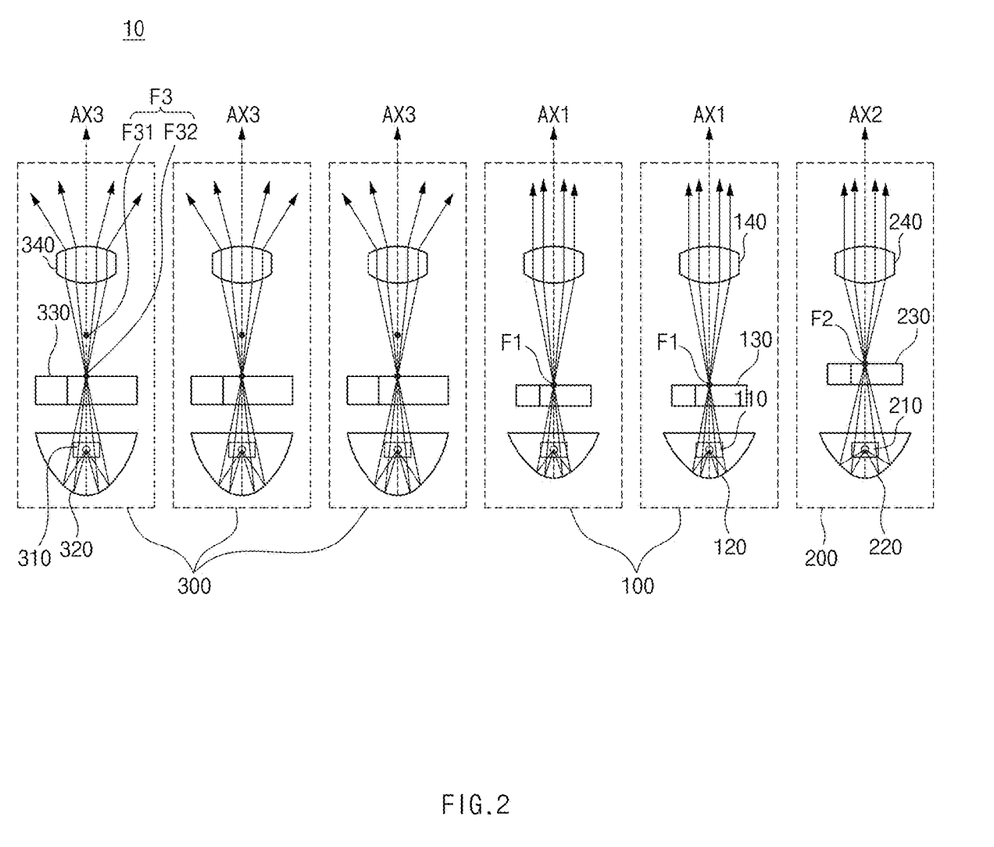
Figure 3:
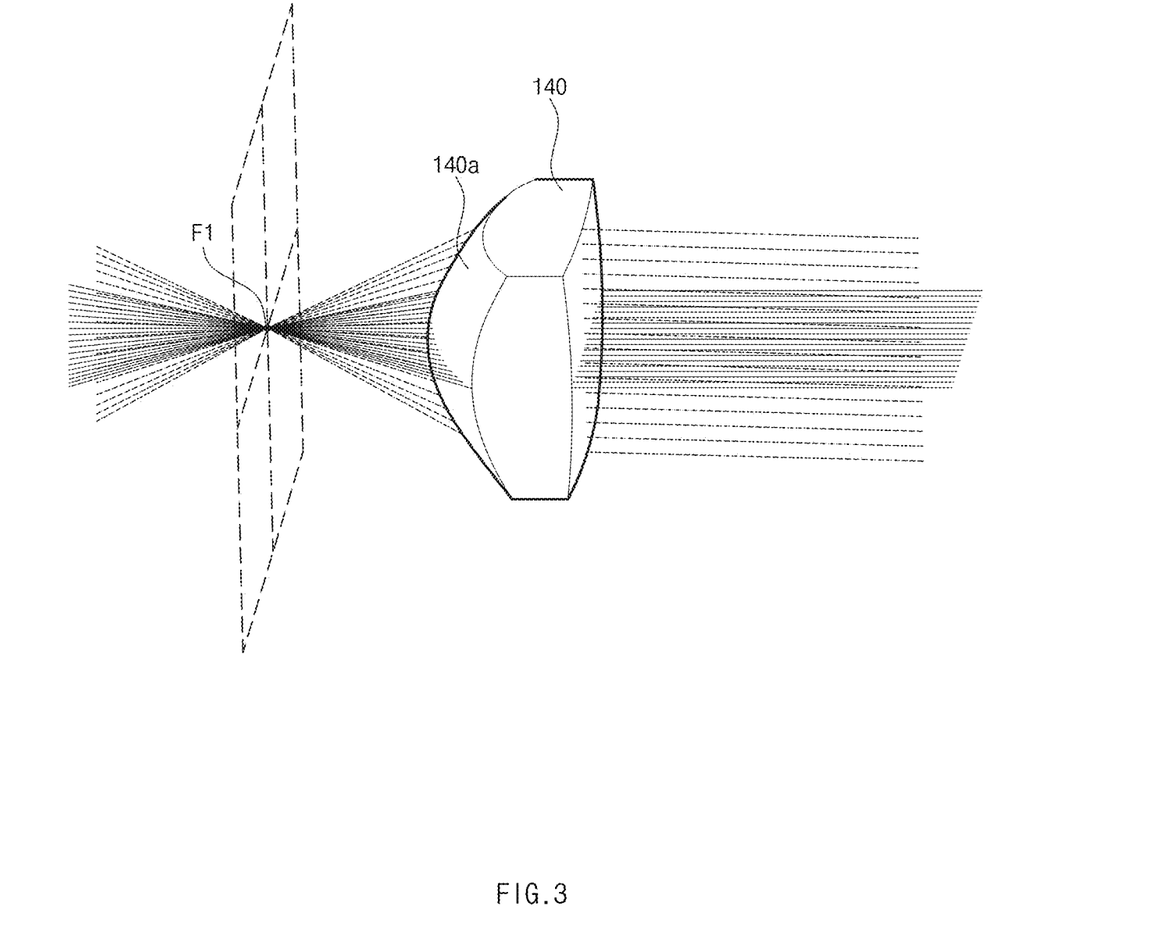
FIG. 3 is a perspective view illustrating a first lens and an optical path formed by the first lens according to an embodiment of the present disclosure.
Figure 4A:
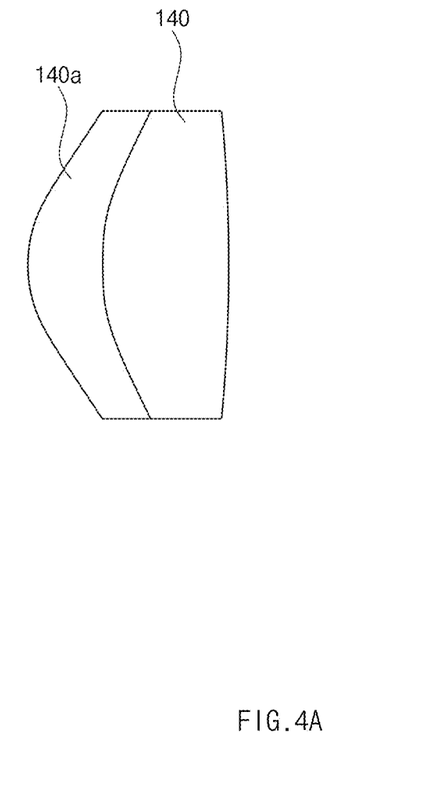
FIG. 4A is a top plan view of the first lens illustrated in FIG. 3.
Figure 4B:
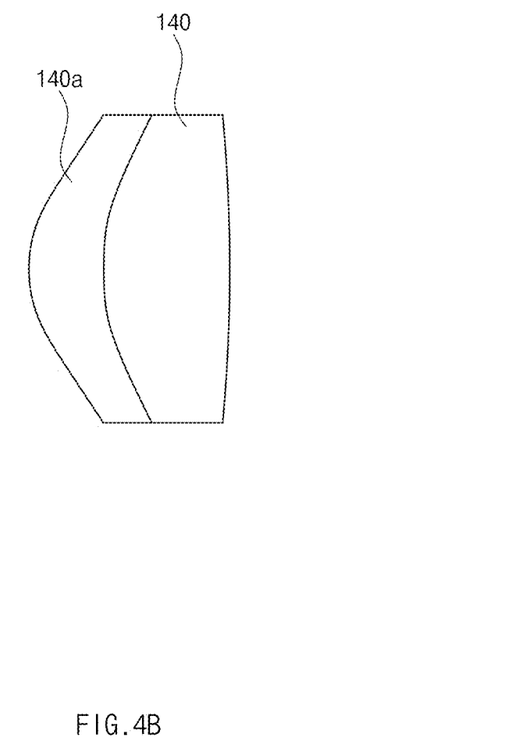
FIG. 4B is a side view of the first lens illustrated in FIG. 3.
Figure 5:
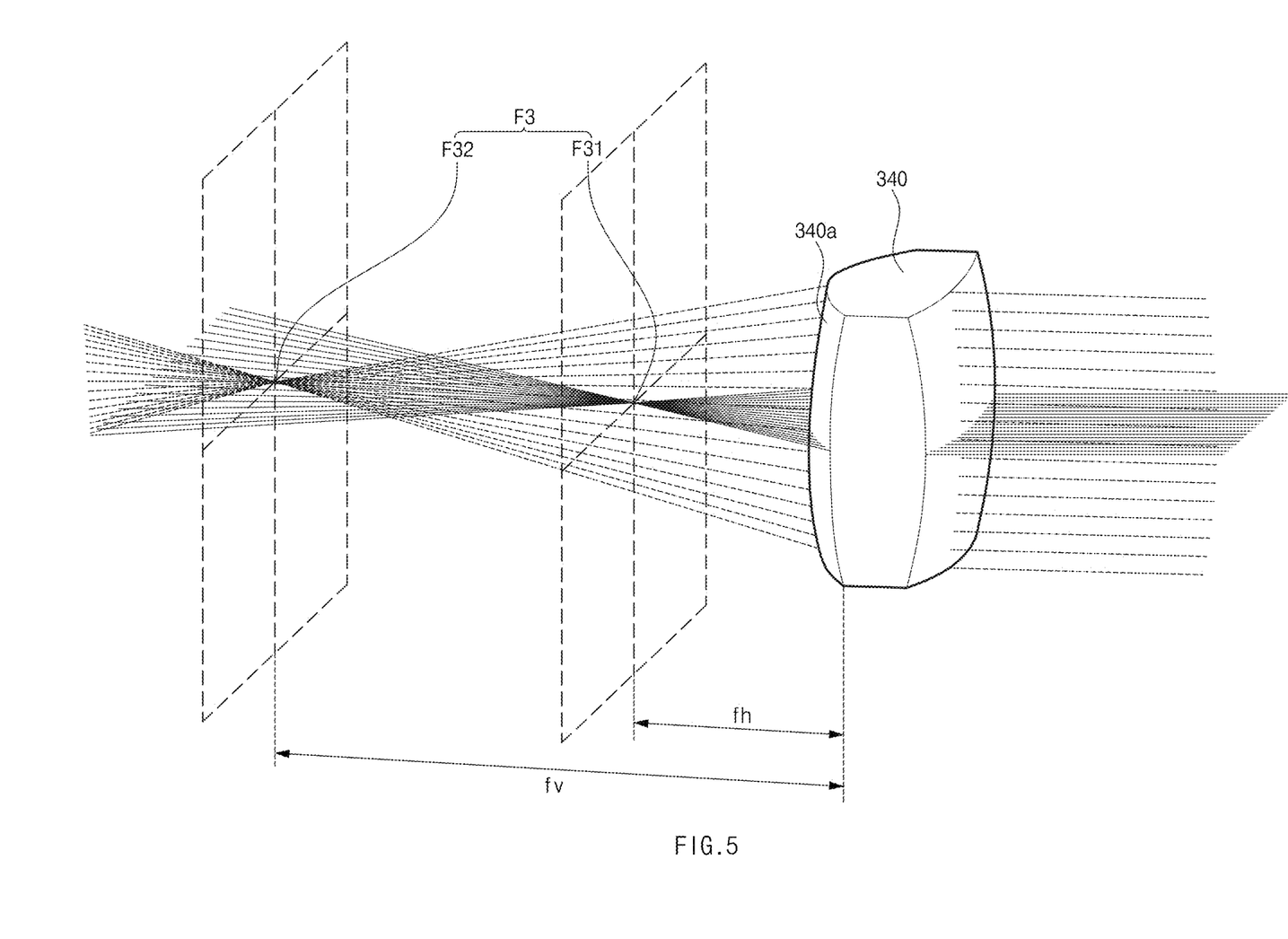
FIG. 5 is a perspective view illustrating a third lens and an optical path formed by the third lens according to an embodiment of the present disclosure.
Figure 6A:
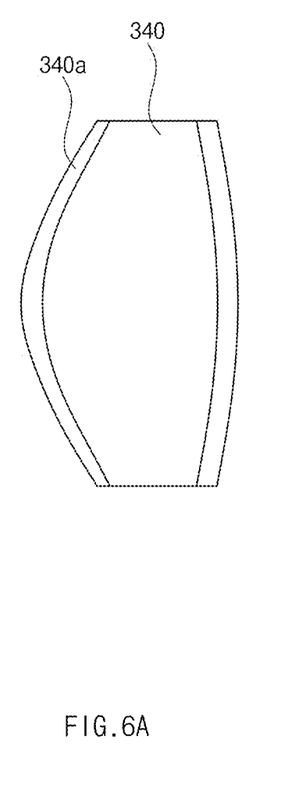
FIG. 6A is a top plan view of the third lens illustrated in FIG. 5.
Figure 6B:
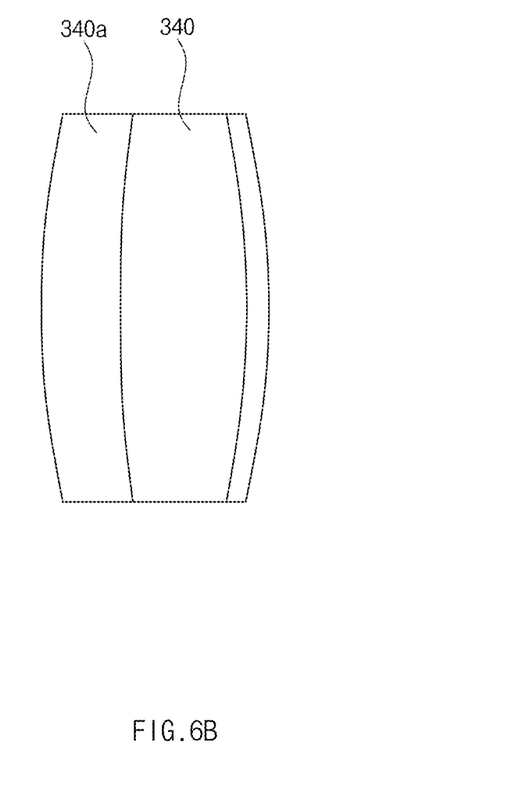
FIG. 6B is a side view of the third lens illustrated in FIG. 5.

FIG. 1 is a schematic perspective view illustrating a vehicle lamp according to an embodiment of the present disclosure. FIG. 2 is a schematic view illustrating the vehicle lamp according to the embodiment of the present disclosure, where FIG. 2 illustrates optical paths formed by a first lamp module, a second lamp module, and a third lamp module. FIG. 3 is a perspective view illustrating a first lens and an optical path formed by the first lens according to an embodiment of the present disclosure. FIG. 4A is a top plan view of the first lens illustrated in FIG. 3. FIG. 4B is a side view of the first lens illustrated in FIG. 3. FIG. 5 is a perspective view illustrating a third lens and an optical path formed by the third lens according to an embodiment of the present disclosure. FIG. 6A is a top plan view of the third lens illustrated in FIG. 5. FIG. 6B is a side view of the third lens illustrated in FIG. 5.

Figure 7A:
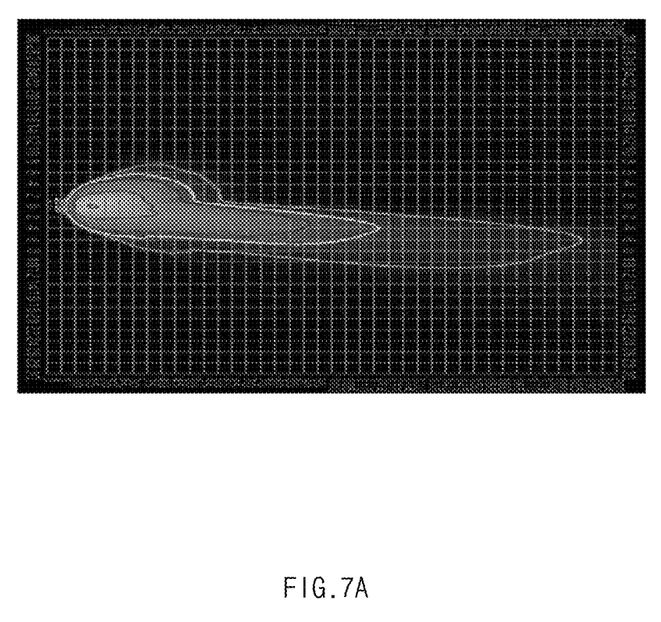
FIG. 7A is a view illustrating a first light distribution pattern according to an embodiment of the present disclosure.
Figure 7B:
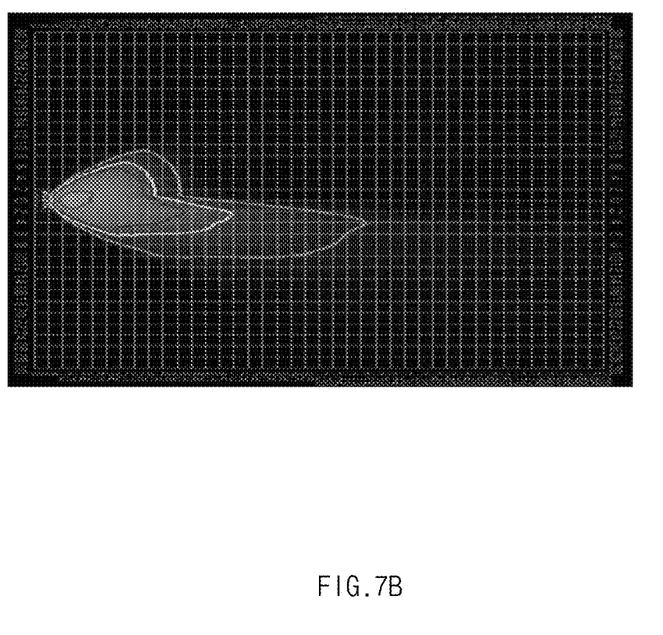
FIG. 7B is a view illustrating a second light distribution pattern according to an embodiment of the present disclosure.
Figure 7C:
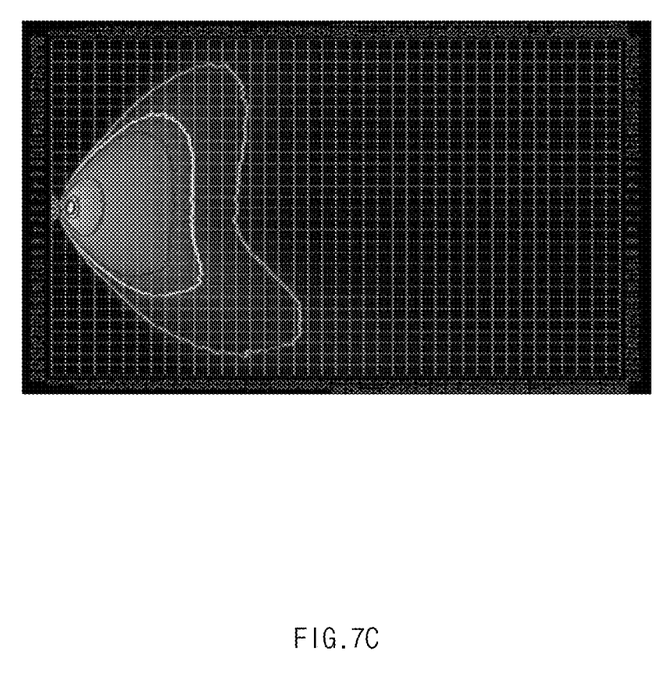
FIG. 7C is a view illustrating a third light distribution pattern according to an embodiment of the present disclosure.
Figure 8:
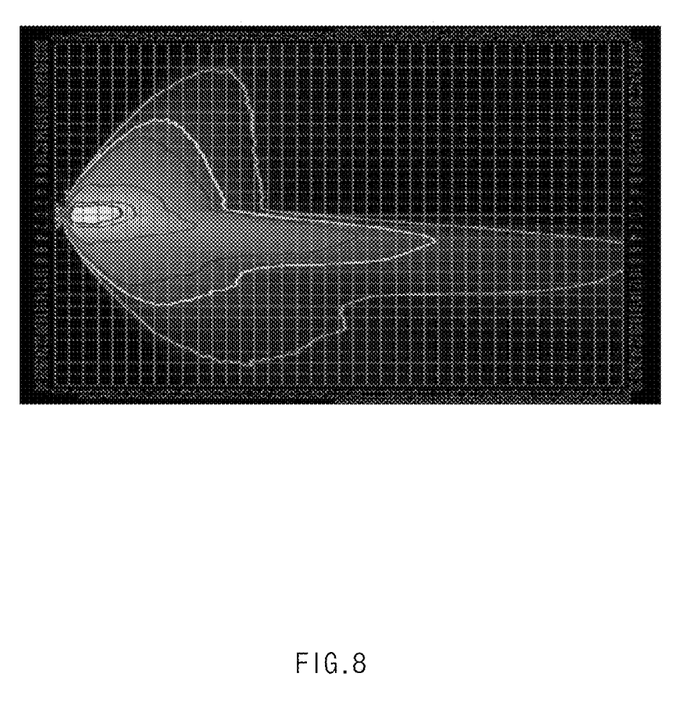
FIG. 8 is a view illustrating a light distribution pattern by the vehicle lamp according to an embodiment of the present disclosure, where the light distribution pattern is a light distribution pattern in which the first light distribution pattern of FIG. 7A, the second light distribution pattern of FIG. 7B, and the third light distribution pattern of FIG. 7C are integrated.

FIG. 7A is a view illustrating a first light distribution pattern according to an embodiment of the present disclosure. FIG. 7B is a view illustrating a second light distribution pattern according to an embodiment of the present disclosure. FIG. 7C is a view illustrating a third light distribution pattern according to an embodiment of the present disclosure. FIG. 8 is a view illustrating a light distribution pattern by the vehicle lamp according to an embodiment of the present disclosure, where the light distribution pattern is a light distribution pattern in which the first light distribution pattern of FIG. 7A, the second light distribution pattern of FIG. 7B, and the third light distribution pattern of FIG. 7C are integrated.

Referring to FIGS. 1 to 8, the vehicle lamp 10 according to the embodiment of the present disclosure includes the first lamp module 100, the second lamp module 200, and the third lamp module 300. The vehicle lamp 10 according to the embodiment of the present disclosure may be used for a lighting function (e.g., a headlamp or a fog lamp), or may be used for a signal function (e.g., a turn signal lamp, a tail lamp, a brake lamp, or a side marker). However, the present disclosure is not limited by the use of the vehicle lamp 10. For example, the vehicle lamp 10 according to the embodiment of the present disclosure may be used as a headlamp of a vehicle that is mounted on a front left side or a front right side of the vehicle and may be used as a headlamp for a low beam among headlamps.

The first lamp module 100 includes the first lens 140 that forms the first light distribution pattern with light emitted from a first light source device 110. The second lamp module 200 includes a second lens 240 that forms the second light distribution pattern with light emitted from a second light source device 210. The third lamp module 300 includes the third lens 340 that forms the third light distribution pattern with light emitted from a third light source device 310.

The first lens 140 and the second lens 240 are formed such that a horizontal focus and a vertical focus are the same as each other, and the third lens 340 is formed such that a horizontal focus and a vertical focus differ from each other.

Specifically, one, two, or more first lamp modules 100 may be provided, and each of the first lamp modules 100 may include the first light source device 110, a first reflector 120, a first shield 130, and the first lens 140.

The first light source device 110 may be implemented with various elements or devices that are able to emit light. For example, the first light source device 110 may include a first light source, and the first light source may be implemented with a light emitting diode (LED).

Furthermore, the first light source device 110 may include a first substrate on which the first light source is mounted. The first substrate may be formed in a plate shape and may be disposed such that one surface thereof faces the first lens 140. The first substrate may be a printed circuit board (PCB), and one or more LEDs may be mounted on the PCB as the first light source and may generate a single color of light or a plurality of colors of light depending on design specifications.

The first reflector 120 may reflect light emitted from the first light source device 110 and may concentrate the light on a first focus F1 formed by the first lens 140. The first shield 130 may be disposed between the first light source device 110 and the first lens 140 and may block part of the light reflected by the first reflector 120. An end portion of the first shield 130 may limit the light emitted from the first light source device 110 such that a cut-off line is formed in the first light distribution pattern.

The first lens 140 may form the first light distribution pattern with the light emitted from the first light source device 110. Specifically, the first lens 140 may be spaced apart from the first shield 130 in a direction in which light exits the first shield 130 and may project the light passing through the first shield 130 to form the first light distribution pattern. In FIGS. 1 and 2, AX1 denotes an optical axis by the first lens 140.

The first lens 140 is formed such that a horizontal focus and a vertical focus are the same as each other. The first lens 140 forms a single focus (refer to FIGS. 2 and 3).

Specifically, the first lens 140 may be formed such that an incident surface 140a on which light is incident, that is, a surface facing toward the first light source device 110 has a horizontal curvature (refer to FIG. 4A) and a vertical curvature (refer to FIG. 4B) that are the same as each other. For example, the first lens 140 may be implemented with an aspheric lens. As described above, the first lens 140 may be designed to have a shape in which the horizontal curvature and the vertical curvature are the same as each other. Accordingly, the position of the horizontal focus and the position of the vertical focus may be the same as each other.

Meanwhile, one, two, or more second lamp modules 200 may be provided, and each of the second lamp modules 200 may include the second light source device 210, a second reflector 220, a second shield 230, and the second lens 240.

The second light source device 210 may be implemented with various elements or devices that are able to emit light. For example, the second light source device 210 may include a second light source, and the second light source may be implemented with a light emitting diode (LED).

Furthermore, the second light source device 210 may include a second substrate on which the second light source is mounted. The second substrate may be formed in a plate shape and may be disposed such that one surface thereof faces the second lens 240. The second substrate may be a printed circuit board (PCB), and one or more LEDs may be mounted on the PCB as the second light source and may generate a single color of light or a plurality of colors of light depending on design specifications.

The second reflector 220 may reflect light emitted from the second light source device 210 and may concentrate the light on a second focus F2 formed by the second lens 240. The second shield 230 may be disposed between the second light source device 210 and the second lens 240 and may block part of the light reflected by the second reflector 220. An end portion of the second shield 230 may limit the light emitted from the second light source device 210 such that a cut-off line is formed in the second light distribution pattern.

The second lens 240 may form the second light distribution pattern with the light emitted from the second light source device 210. In FIGS. 1 and 2, AX2 denotes an optical axis by the second lens 240.

Specifically, the second lens 240 may be spaced apart from the second shield 230 in a direction in which light exits the second shield 230 and may project the light passing through the second shield 230 to form the second light distribution pattern. The shape of the second light distribution pattern may differ from the shape of the first light distribution pattern.

The second lens 240 is formed such that a horizontal focus and a vertical focus are the same as each other. The second lens 240 forms a single focus.

Specifically, the second lens 240 may be formed such that an incident surface on which light is incident, that is, a surface facing toward the second light source device 210 has a horizontal curvature and a vertical curvature that are the same as each other. For example, the second lens 240 may be implemented with an aspheric lens. As described above, the second lens 240 may be designed such that the horizontal curvature and the vertical curvature are the same as each other. Accordingly, the position of the horizontal focus and the position of the vertical focus may be the same as each other.

One, two, or more third lamp modules 300 may be provided, and each of the third lamp modules 300 may include the third light source device 310, a third reflector 320, a third shield 330, and the third lens 340.

The third light source device 310 may be implemented with various elements or devices that are able to emit light. For example, the third light source device 310 may include a third light source, and the third light source may be implemented with a light emitting diode (LED).

Furthermore, the third light source device 310 may include a third substrate on which the third light source is mounted. The third substrate may be formed in a plate shape and may be disposed such that one surface thereof faces the third lens 340. The third substrate may be a printed circuit board (PCB), and one or more LEDs may be mounted on the PCB as the third light source and may generate a single color of light or a plurality of colors of light depending on design specifications.

The first substrate, the second substrate, and the third substrate may be disposed on the same virtual plane. Specifically, the second substrate and the third substrate may be disposed on a virtual plane extending from the first substrate, and thus the first substrate, the second substrate, and the third substrate may all be disposed on the same plane.

Accordingly, a volume used to arrange the first lamp module 100, the second lamp module 200, and the third lamp module 300 may be minimized.

However, the types and structures of the first light source device 110, the second light source device 210, and the third light source device 310 are not limited to those described above. For example, various light sources, such as a laser diode, a bulb, a halogen lamp, a xenon lamp (an HID), and the like may be used.

The third reflector 320 may reflect light emitted from the third light source device 310 and may concentrate the light on a third focus F3 formed by the third lens 340. The third shield 330 may be disposed between the third light source device 310 and the third lens 340 and may block part of the light reflected by the third reflector 320. An end portion of the third shield 330 may limit the light emitted from the third light source device 310 such that a cut-off line is formed in the third light distribution pattern.

The third lens 340 may form the third light distribution pattern with the light emitted from the third light source device 310. In FIGS. 1 and 2, AX3 denotes an optical axis by the third lens 340.

Specifically, the third lens 340 may be spaced apart from the third shield 330 in a direction in which light exits the third shield 330 and may project the light passing through the third shield 330 to form the third light distribution pattern. The third light distribution pattern may have different characteristics from the first light distribution pattern and the second light distribution pattern.

When the first to third light distribution patterns have different characteristics in the embodiment of the present disclosure, it means that the first light distribution pattern, the second light distribution pattern, and the third light distribution pattern have different light distribution characteristics and projected pattern images. This may be implemented by the difference in characteristics and shapes between the lens, the reflectors, and the shields included in the lamp modules.

For example, the first light distribution pattern may be a long-distance light distribution pattern (Hot Zone Spot) for ensuring a view of a central region ahead. The third light distribution pattern may be a light distribution pattern (Wide Zone) for ensuring a view of a peripheral region ahead and ensuring visibility during turning. The second light distribution pattern may be a light distribution pattern (Hot Zone Spread) for minimizing a sense of difference between the first light distribution pattern (Hot Zone Spot) and the third light distribution pattern (Wide Zone). The second light distribution pattern may be designed to ensure a wider area than the first light distribution pattern.

The third lens 340 may be formed such that a third horizontal focus F31 and a third vertical focus F32 differ from each other (refer to FIGS. 2 and 5).

For example, the third lens 340 may be formed such that a horizontal curvature (refer to FIG. 6A) and a vertical curvature (refer to FIG. 6B) of an incident surface 340a on which light is incident differ from each other. The position of the third horizontal focus F31 and the position of the third vertical focus F32 may differ from each other by designing the third lens 340 such that the horizontal curvature and the vertical curvature differ from each other. For example, the third lens 340 may be implemented with an anamorphic lens.

As described above, the vehicle lamp 10 according to the embodiment of the present disclosure includes the plurality of unit lamp modules designed to be separated from one another depending on light distribution characteristics and images. Accordingly, the vehicle lamp 10 may be designed such that optical efficiency thereof is optimized.

In an embodiment of the present disclosure, the first lamp module 100, the second lamp module 200, and the third lamp module 300 may be arranged in a predetermined form. One or more first lamp modules 100, second lamp modules 200, and third lamp modules 300 may be provided.

For example, as in the illustrated embodiment, two first lamp modules 100, one second lamp module 200, and three third lamp modules 300 may be provided, and the first lamp modules 100, the second lamp module 200, and the third lamp module 300 may be arranged in a row. However, the arrangement and numbers of first lamp modules 100, second lamp modules 200, and third lamp modules 300 are not limited thereto, and various changes and modifications can be made. For example, as illustrated in FIGS. 1 and 2, the second lamp module 200, the first lamp modules 100, and the third lamp modules 300 of the vehicle lamp 10 may be sequentially disposed along one direction.

In an embodiment of the present disclosure, the unit lamp modules may be implemented in various sizes and arrangements depending on requirements and design specifications. The present disclosure may implement a low-beam structure having differentiated design by enabling various arrangements of the unit lamp modules.

For example, the first lamp module 100, the second lamp module 200, and the third lamp module 300, which are unit lamp modules, may each be provided inside a small virtual cube to enable the various arrangements. This is a design specification that can be implemented by dividing the vehicle lamp 10 into the unit lamp modules depending on light distribution patterns.

For example, each of the first lamp module 100, the second lamp module 200, and the third lamp module 300 may be provided inside a virtual cube having a height and a width of 10 mm to 20 mm when viewed from the front, more preferably, a virtual cube having a height and a width of about 15 mm. However, the sizes of the first lamp module 100, the second lamp module 200, and the third lamp module 300 are not limited thereto, and various changes and modifications can be made depending on design specifications.

By dividing the vehicle lamp 10 into the unit lamp modules depending on light distribution patterns and diversifying the sizes and numbers of the unit lamp modules, optical efficiency may be optimized, and competitiveness through design differentiation may be ensured.

Meanwhile, referring to the embodiment illustrated in FIG. 2, when the distance between the first focus F1 formed by the first lens 140 and the first lens 140 is referred to as a first focal distance and the distance between the second focus F2 formed by the second lens 240 and the second lens 240 is referred to a second focal distance, the first focal distance may be longer than or equal to the second focal distance.

For example, the first focal distance may be designed to be about 35 mm or more, and the second focal distance may be formed in the range of 15 mm to 35 mm. However, the first focal distance and the second focal distance are not limited thereto, and various changes and modifications can be made depending on design specifications.

Accordingly, the first lens 140 may implement the first light distribution pattern (Hot Zone Spot) that has a relatively narrow width in a left/right direction, but has a high luminous intensity (refer to FIG. 7A), and the second lens 240 may form the second light distribution pattern (Hot Zone Spread) that has a wider range than the first light distribution pattern to minimize a sense of difference between the first light distribution pattern and the third light distribution pattern (refer to FIG. 7B).

Meanwhile, when the distance between the third horizontal focus F31 formed by the third lens 340 in the horizontal direction and the third lens 340 is referred to as a third horizontal focal distance fh and the distance between the third vertical focus F32 formed by the third lens 340 in the vertical direction and the third lens 340 is referred to as a third vertical focal distance fv, the third lens 340 may be formed such that the third horizontal focal distance fh is shorter than the third vertical focal distance fv.

For example, the third horizontal focal distance fh may be about 100 mm or less, and the third vertical focal distance fv may be about 30 mm or more. As described above, the third lens 340, which is implemented with an anamorphic lens, may be designed such that the third horizontal focal distance fh and the third vertical focal distance fv differ from each other. Accordingly, the third lens 340 may form the third light distribution pattern (Wide Zone) in which light widely spreads in the horizontal direction (refer to FIG. 7C).

Referring to FIGS. 5 and 6, the horizontal curvature and the vertical curvature of the incident surface 340a of the third lens 340, on which light is incident, may differ from each other such that the third horizontal focal distance fh is shorter than the third vertical focal distance fv. Specifically, the third lens 340 may be formed such that the horizontal curvature (refer to FIG. 6A) is greater than the vertical curvature (refer to FIG. 6B).

Meanwhile, the second lens 240 and the third lens 340 may be formed such that the third horizontal focal distance fh is shorter than or equal to the second focal distance.

Accordingly, the third light distribution pattern by the third lens 340 may form a light pattern that more widely spreads in the horizontal direction than the second light distribution pattern by the second lens 240. Due to the third light distribution pattern (Wide Zone), a driver may ensure visibility of a peripheral region ahead and may ensure visibility during turning.

Specifically, the third lens 340 may be designed such that the third horizontal focal distance fh is shorter than or equal to the second focal distance, and thus an image magnification may be raised. Accordingly, the third lens 340 may form a wide angle despite a small size, and the third light distribution pattern may widely spread in the horizontal direction.

In general, the shorter the focal distance of a lens, the larger the magnification of an image. In a case of the same focal distance, a wide angle may be formed by rays passing through regions far away from a focus. When a lens has a large size, a wide angle is able to be formed based on this principle. However, when a lens has a small size, rays passing through regions far away from a focus are not incident on the lens, and therefore the small-sized lens may fail to form a wide angle.

To solve such a problem, in the embodiment of the present disclosure, a wide angle may be formed by raising a magnification by making the third horizontal focal distance fh of the third lens 340 shorter. Furthermore, in a case of designing a focal distance to be very short, a lens may be sensitive to a tolerance, and therefore a tolerance may be ensured by making the third vertical focal distance fv longer instead of making the third horizontal focal distance fh of the third lens 340 shorter.

As described above, the vehicle lamp 10 according to the embodiment of the present disclosure includes the plurality of unit lamp modules having a small cube shape, thereby implementing various designs and includes the third lens 340 having the horizontal focus and the vertical focus different from each other to form a wide angle and ensure a tolerance, thereby improving lamp performance and manufacturability.

The third light distribution pattern may have a larger area than the second light distribution pattern, and the second light distribution pattern may have a larger area than the first light distribution pattern. This may be implemented by designing the lenses such that the focal distances are formed as described above.

Meanwhile, the first reflector 120, the second reflector 220, and the third reflector 320 may have different sizes and shapes. The first shield 130, the second shield 230, and the shield reflector 330 may have different sizes and shapes.

The first light distribution pattern, the second light distribution pattern, and the third light distribution pattern may have different light distribution characteristics. That is, as described above, the first lens 140, the second lens 240, and the third lens 340 may have different lens characteristics, and the shields and the reflectors included in the respective lamp modules may have different sizes and shapes. Accordingly, different light distribution patterns may be formed.

Meanwhile, referring to FIG. 2, for example, the periphery of a light exit side of the first shield 130 may be disposed to correspond to the first focus F1, and the periphery of a light exit side of the second shield 230 may be disposed to correspond to the second focus F2. Furthermore, the periphery of a light exit side of the third shield 330 may be disposed to correspond to the third vertical focus F32. Accordingly, the first, second, and third shields 130, 230, and 330 may partly limit travel of light from the first, second, and third light source devices 310, 320, and 330 in the vertical direction, and cut-off lines may be formed in the first to third light distribution patterns. In particular, because the third horizontal focus F31 is a focus for a pattern formed in the horizontal direction, the third shield 330 may be disposed at the third vertical focus 32 to form a cut-off line.

According to the present disclosure, by dividing the vehicle lamp into the unit lamp modules depending on the light distribution patterns and diversifying the sizes and numbers of the unit lamp modules, optical efficiency may be optimized, and competitiveness through design differentiation may be ensured.

In addition, the vehicle lamp according to the embodiment of the present disclosure includes the plurality of unit lamp modules having a small cube shape, thereby implementing various designs and includes the third lens having the horizontal focus and the vertical focus different from each other to form a wide angle and ensure a tolerance, thereby improving lamp performance.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A lamp for a vehicle, the lamp comprising:
 a first lamp module including:
  a first lens configured to form a first light distribution pattern with light emitted from a first light source device,
  a first reflector configured to concentrate the light emitted from the first light source device on a first focus formed by the first lens, and
  a first shield configured to block part of light reflected by the first reflector;
 a second lamp module including:
  a second lens configured to form a second light distribution pattern with light emitted from a second light source,
  a second reflector configured to concentrate the light emitted from the second light source device on a second focus formed by the second lens, and
  a second shield configured to block part of light reflected by the second reflector; and
 a third lamp module including:
  a third lens configured to form a third light distribution pattern with light emitted from a third light source device, wherein the third lens is formed such that a third horizontal focus and a third vertical focus differ from each other, a third shield configured to block part of light reflected by the third reflector, and a third reflector configured to concentrate the light emitted from the third light source device on the third horizontal focus and the third vertical focus, wherein the first lens and the second lens are formed such that a horizontal focus and a vertical focus are the same as each other, a distance between the first focus and the first lens is longer than or equal to a distance between the second focus and the second lens, a distance between a third horizontal focus formed by the third lens in a horizontal direction and the third lens is shorter than a distance between a third vertical focus formed by the third lens in a vertical direction and the third lens, the first reflector, the second reflector, and the third reflector have different sizes and shapes, the first shield, the second shield, and the third shield have different sizes and shapes, and the first light distribution pattern, the second light distribution pattern, and the third light distribution pattern have different light distribution characteristics.

2. The lamp of claim 1, wherein:

the first lamp module, the second lamp module, and the third lamp module are arranged in a predetermined form, and the first lamp module, the second lamp module, and the third lamp module include one or more first lamp modules, one or more second lamp modules, and one or more third lamp modules, respectively.

3. The lamp of claim 1, wherein the first lens and the second lens are formed such that a horizontal curvature and a vertical curvature of an incident surface on which light is incident are the same as each other.

4. The lamp of claim 1, wherein each of the first lens and the second lens is implemented with an aspheric lens.

5. The lamp of claim 1, wherein a horizontal curvature and a vertical curvature of an incident surface of the third lens on which light is incident differ from each other such that the third horizontal focal distance is shorter than the third vertical focal distance.

6. The lamp of claim 1, wherein the second lens and the third lens are formed such that the distance between the third horizontal focus formed by the third lens in the horizontal direction and the third lens is shorter than the distance between the third vertical focus formed by the third lens in the vertical direction and the third lens.

7. The lamp of claim 1, wherein the third light distribution pattern has a larger area than the second light distribution pattern, and the second light distribution pattern has a larger area than the first light distribution pattern.

8. The lamp of claim 1, wherein the third shield is disposed at the third vertical focus.

9. The lamp of claim 1, wherein:

the first light source device includes a first substrate on which a first light source is disposed, the second light source device includes a second substrate on which a second light source is disposed, the third light source device includes a third substrate on which a third light source is disposed, and the first substrate, the second substrate, and the third substrate are disposed on the same virtual plane.

\* \* \* \* \*